US012706904B2

(12) United States Patent
Guo et al.

(10) Patent No.: US 12,706,904 B2
(45) **Date of Patent: *Aug. 11, 2026**

(54) AUTHENTICATED MESSAGING SESSION WITH CONTACTLESS CARD AUTHENTICATION

(71) Applicant: Capital One Services, LLC, McLean, VA (US)

(72) Inventors: Rocky Guo, Falls Church, VA (US); Jeffrey Rule, Chevy Chase, MD (US); Lukiih Cuan, Washington, DC (US); Gaurang Bhatt, Herndon, VA (US)

(73) Assignee: Capital One Services, LLC., McLean, VA (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/965,002

(22) Filed: Dec. 2, 2024

(65) Prior Publication Data

US 2025/0175461 A1 May 29, 2025

Related U.S. Application Data

(63) Continuation of application No. 17/231,481, filed on Apr. 15, 2021, now Pat. No. 12,160,419.

(51) Int. Cl.
*H04L 29/06* (2006.01)
*H04L 9/40* (2022.01)

(52) U.S. Cl.
CPC ........ *H04L 63/0853* (2013.01); *H04L 63/123* (2013.01)

(58) Field of Classification Search
CPC ............. H04L 63/0853; H04L 63/123; H04W 12/065; G06F 21/35
See application file for complete search history.

(56) References Cited

U.S. PATENT DOCUMENTS

| | | |
|---|---|---|
| 5,590,038 A | 12/1996 | Pitroda |
| 5,666,415 A | 9/1997 | Kaufman |

(Continued)

FOREIGN PATENT DOCUMENTS

| | | |
|---|---|---|
| CN | 101192295 A | 6/2008 |
| GB | 2516861 A | 2/2015 |

(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(Continued)

*Primary Examiner* — Khalid M Almaghayreh
(74) *Attorney, Agent, or Firm* — KDW FIRM PLLC

(57) ABSTRACT

The exemplary embodiments described herein overcome problems encountered by conventional systems by providing an authenticated messaging environment in which a user can securely message with a programmatic intelligent agent. The user may be authenticated at the prompting of the programmatic intelligent agent, such as the beginning of a messaging session or when the user submits a request that requires access to sensitive or confidential information or requires access to a secure account. The prompt may take the form of a message sent from the programmatic intelligent agent. The message may contain a link for launching code, such as an application, that facilitates authentication of the user's identity. The user may activate the link to launch the code and then perform the steps requested by the code to perform the authentication.

20 Claims, 18 Drawing Sheets

(56) References Cited

U.S. PATENT DOCUMENTS 6,199,114 B1 3/2001 White
6,324,271 B1 11/2001 Sawyer
6,367,011 B1 4/2002 Lee
6,572,015 B1 6/2003 Norton
7,252,242 B2 8/2007 Ho
7,270,276 B2 9/2007 Vayssiere
7,287,692 B1 10/2007 Patel
7,374,099 B2 5/2008 de Jong
7,527,208 B2 5/2009 Hammad
7,568,631 B2 8/2009 Gibbs
7,584,153 B2 9/2009 Brown
7,628,322 B2 12/2009 Holtmanns
7,793,851 B2 9/2010 Mullen
7,801,799 B1 9/2010 Brake, Jr.
7,908,216 B1 3/2011 Davis
7,922,082 B2 4/2011 Muscato
8,010,405 B1 8/2011 Bortolin
8,074,877 B2 12/2011 Mullen
8,082,450 B2 12/2011 Frey
8,108,687 B2 1/2012 Ellis
8,186,602 B2 5/2012 Itay
8,196,131 B1 6/2012 von Behren
8,249,654 B1 8/2012 Zhu
8,276,814 B1 10/2012 Davis
8,332,272 B2 12/2012 Fisher
8,346,670 B2 1/2013 Hasson
8,511,547 B2 8/2013 Rans
8,519,822 B2 8/2013 Riegebauer
8,750,514 B2 * 6/2014 Gallo .................... G06Q 10/10 709/219
8,870,081 B2 10/2014 Olson
9,038,893 B2 5/2015 Kirkham
9,129,199 B2 9/2015 Spodak
9,183,490 B2 11/2015 Moreton
9,275,325 B2 3/2016 Newcombe
9,286,606 B2 3/2016 Diamond
9,306,753 B1 4/2016 Vandervort
9,501,776 B2 11/2016 Martin
9,710,744 B2 7/2017 Wurmfeld
9,949,065 B1 4/2018 Zarakas
9,965,632 B2 5/2018 Zarakas
9,965,911 B2 5/2018 Wishne
9,977,890 B2 5/2018 Alberti
9,978,056 B2 5/2018 Seo
9,978,058 B2 5/2018 Wurmfeld
9,990,795 B2 6/2018 Wurmfeld
10,007,873 B2 6/2018 Heo
10,013,693 B2 7/2018 Wyatt
10,121,130 B2 11/2018 Pinski
10,210,505 B2 2/2019 Zarakas
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,419,934 B1 9/2019 Säpunaru et al.
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule
10,685,349 B2 6/2020 Brickell
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,062,098 B1 7/2021 Bergeron
11,107,141 B1 * 8/2021 Nagarajappa ...... G06Q 30/0617
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 * 8/2022 Ho ...................... G06Q 20/346
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 McHugh
11,777,933 B2 10/2023 Moreton
2003/0220876 A1 11/2003 Burger
2005/0138387 A1 * 6/2005 Lam ...................... H04L 9/3234 713/185
2005/0156026 A1 7/2005 Ghosh
2005/0228997 A1 10/2005 Bicker
2005/0269402 A1 12/2005 Spitzer
2007/0276765 A1 11/2007 Hazel
2008/0082452 A1 4/2008 Wankmueller
2008/0099552 A1 5/2008 Grillion
2009/0143104 A1 6/2009 Loh
2009/0235339 A1 9/2009 Mennes
2009/0282264 A1 11/2009 Amiel
2011/0113245 A1 5/2011 Varadarajan
2011/0137797 A1 * 6/2011 Stals ...................... G06Q 20/20 705/44
2011/0155801 A1 6/2011 Rowberry
2012/0072350 A1 * 3/2012 Goldthwaite .......... G06Q 20/02 705/44
2012/0074232 A1 * 3/2012 Spodak ............. G06Q 20/3574 235/492
2012/0143703 A1 6/2012 Wall
2012/0260324 A1 * 10/2012 Lenon ................. G06Q 20/385 726/6
2013/0030997 A1 1/2013 Spodak
2013/0146657 A1 6/2013 Graef
2013/0173759 A1 * 7/2013 Herse ................. H04W 12/069 709/219
2013/0211937 A1 8/2013 Elbirt
2013/0311363 A1 11/2013 Ramaci
2014/0074637 A1 3/2014 Hammad
2014/0074655 A1 3/2014 Lim
2014/0081785 A1 3/2014 Valadas Preto
2014/0365377 A1 12/2014 Salama
2015/0032635 A1 1/2015 Guise
2015/0073983 A1 3/2015 Bartenstein
2015/0106186 A1 * 4/2015 Hopkinson ........ G06Q 20/3278 705/14.27
2015/0113271 A1 4/2015 Jooste
2015/0134513 A1 5/2015 Olson
2015/0180822 A1 * 6/2015 Mathias ............. H04L 65/1089 709/206
2015/0199673 A1 7/2015 Savolainen
2015/0199863 A1 7/2015 Scoggins
2015/0254637 A1 9/2015 Yang
2015/0317295 A1 11/2015 Sherry
2016/0078430 A1 3/2016 Douglas
2016/0189143 A1 6/2016 Koeppel
2016/0253651 A1 9/2016 Park
2016/0277383 A1 9/2016 Guyomarc'h
2016/0307189 A1 10/2016 Zarakas
2016/0314472 A1 10/2016 Ashfield
2016/0379217 A1 12/2016 Hammad

(56) References Cited

U.S. PATENT DOCUMENTS

| | | | | |
|---|---|---|---|---|
| 2017/0017957 | A1 | 1/2017 | Radu | |
| 2017/0039566 | A1 | 2/2017 | Schipperheijn | |
| 2017/0068950 | A1 | 3/2017 | Kwon | |
| 2017/0330173 | A1 | 11/2017 | Woo | |
| 2017/0330184 | A1* | 11/2017 | Sabt | G06Q 20/327 |
| 2018/0039987 | A1 | 2/2018 | Molino | |
| 2018/0183735 | A1* | 6/2018 | Naydonov | H04L 51/02 |
| 2018/0268132 | A1 | 9/2018 | Buer | |
| 2018/0300716 | A1 | 10/2018 | Carlson | |
| 2019/0172055 | A1 | 6/2019 | Hale | |
| 2019/0238517 | A1* | 8/2019 | D'Agostino | H04L 63/0428 |
| 2019/0297184 | A1* | 9/2019 | Chavez | H04L 41/0654 |
| 2019/0303945 | A1 | 10/2019 | Mitra | |
| 2020/0244700 | A1* | 7/2020 | Moon | G06F 40/35 |
| 2021/0004806 | A1 | 1/2021 | Noe | |
| 2021/0272098 | A1 | 9/2021 | Delsuc | |
| 2021/0304189 | A1 | 9/2021 | Gupta | |
| 2021/0314282 | A1* | 10/2021 | Sharma | G06F 3/167 |
| 2021/0383360 | A1 | 12/2021 | Sinha | |
| 2021/0406869 | A1 | 12/2021 | Pathrabe | |
| 2022/0114581 | A1 | 4/2022 | Upadhye | |
| 2022/0284416 | A1 | 9/2022 | Rule | |
| 2022/0309509 | A1 | 9/2022 | Akgun | |
| 2022/0335412 | A1 | 10/2022 | Rule | |
| 2022/0366410 | A1 | 11/2022 | Rule | |
| 2022/0398566 | A1 | 12/2022 | Rule | |
| 2022/0414648 | A1 | 12/2022 | Rule | |
| 2023/0054157 | A1 | 2/2023 | Mao | |
| 2023/0065163 | A1 | 3/2023 | Vargas | |
| 2023/0083785 | A1 | 3/2023 | Maiman | |
| 2023/0169505 | A1 | 6/2023 | Rule | |
| 2023/0354020 | A1 | 11/2023 | Rule | |
| 2023/0359839 | A1 | 11/2023 | Lovgren | |

FOREIGN PATENT DOCUMENTS

| | | | |
|---|---|---|---|
| GB | 2551907 | A | 1/2018 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2014020227 | A1 | 2/2014 |
| WO | 2015183818 | A1 | 12/2015 |
| WO | 2017047855 | A1 | 3/2017 |
| WO | 2019022585 | A1 | 1/2019 |
| WO | 2020242820 | A1 | 12/2020 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: MAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

600

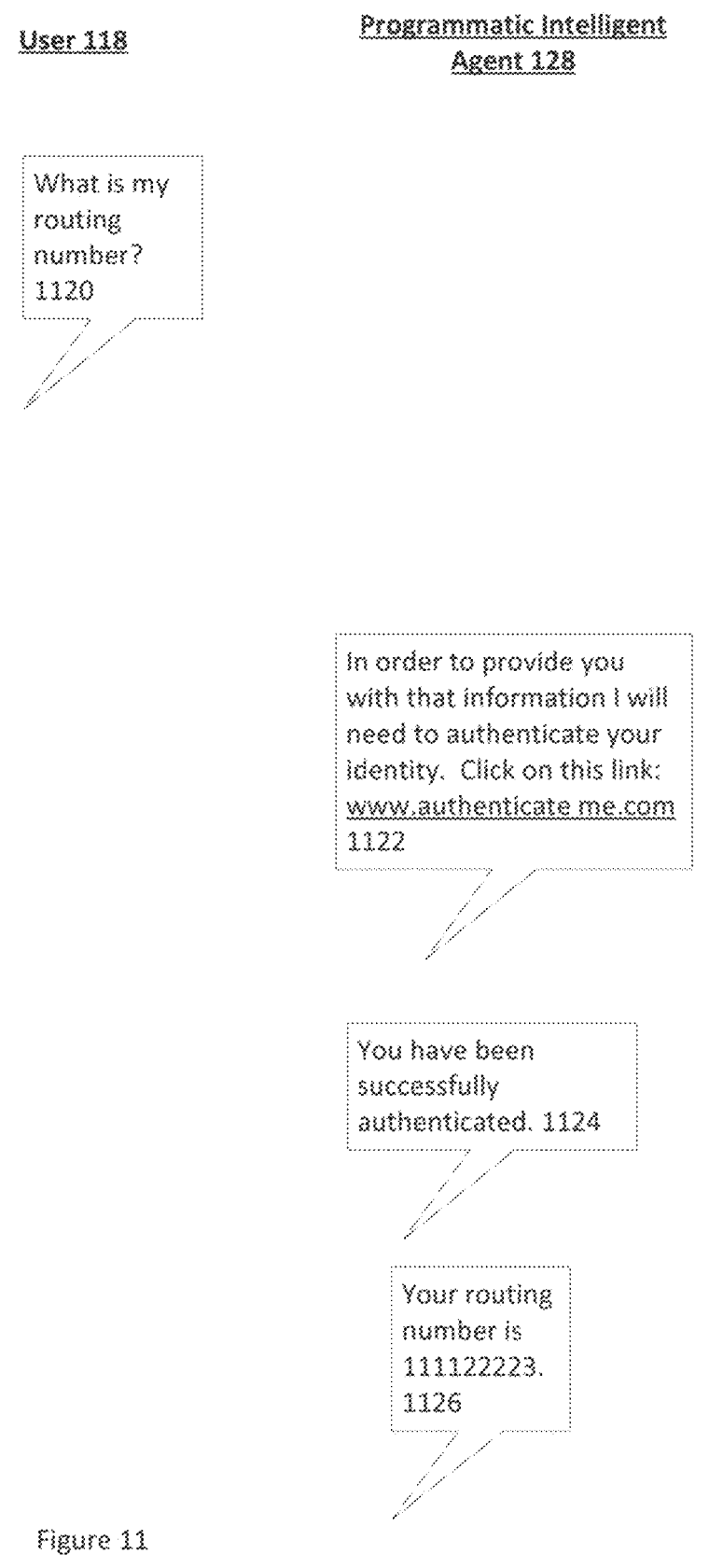

User 118

Programmatic Intelligent Agent 128

What is my routing number? 1120

In order to provide you with that information I will need to authenticate your identity. Click on this link: www.authenticate me.com 1122

You have been successfully authenticated. 1124

Your routing number is 111122223. 1126

Figure 11

AUTHENTICATED MESSAGING SESSION WITH CONTACTLESS CARD AUTHENTICATION

CROSS-REFERENCE TO RELATED APPLICATIONS

This application is a continuation of U.S. patent application Ser. No. 17/231,481, filed on Apr. 15, 2021. The contents of the aforementioned patent application are incorporated herein by reference in its entirety.

BACKGROUND

Financial institutions, like banks and brokerage houses, have begun to employ programmatic intelligent agents, like chatbots, to interact with customers online. The programmatic intelligent agents may be deployed in a number of digital channels, including with messaging services, such as Short Message Service (SMS) ("text"). One challenge with the SMS digital channel is that it relatively insecure. There is no guarantee that a party communicating via SMS is who they present themselves as. Moreover, unwanted observers may observe SMS messaging sessions. Thus, when a customer texts a programmatic intelligent agent of a financial institution for confidential information, such as the routing number for the checking account of the customer, it is problematic for the programmatic intelligent agent to provide the confidential information to the customer via an SMS message.

SUMMARY

In accordance with a first inventive aspect, a method includes receiving a message from a party via a messaging service at a programmatic intelligent agent running on a processor of a computing device. The message requests a response message from the programmatic intelligent agent. The processor determines that authentication by contactless card is needed. A request message is sent from the programmatic intelligent agent to the party. The request message contains information for launching code for authenticating the party via contactless card. Confirmation is received at the programmatic intelligent agent that the party has been authenticated via contactless card. An authenticated messaging session is initiated between the party and the programmatic intelligent agent.

The received message from the party may request access to confidential information or sensitive information. The method may include generating and sending the response message to the party. The response message may contain at least some of the confidential information or at least some of the sensitive information. The party may have a secure account with an institution, and the method may include the programmatic intelligent agent accessing the secure account to generate the response message. The received message from the party may request a financial transaction. The messaging service may be a Short Message Service (SMS) messaging service. A time limit to the authenticated messaging session may be established such that, at expiration of the time limit, the messaging session is no longer authenticated In accordance with another inventive aspect, a method includes initiating the sending of a message via a messaging service with a processor of a device, where the message seeks a response message to a programmatic intelligent agent. In response to the sending of the message, a prompt from the programmatic intelligent agent is received via the messaging service to authenticate identity via a contactless card. Information from the contactless card is obtained by the processor. The processor forwards the obtained information to an authenticating authority to authenticate the identity. Where the authentication by the authenticating authority is successful, the response message is received from the programmatic intelligent agent.

The obtaining of the information from the contactless card may be responsive to the contactless card being in proximity with the device. The device may include Near Field Communication (NFC) capabilities, and the information may be obtained by NFC with the contactless card. The obtained information may include credentials and identity information. The information may be obtained and forwarded in encrypted and/or hashed form. A request message may be received via the messaging service from the programmatic intelligent agent. The request message may have a link to launch an application on the device for authenticating the identity. The message seeking the response message may request information regarding a secure account at a financial institution. The message seeking the response message may request a financial transaction. The device may be a smartphone, and the prompt may contain a link to launch an application installed on the smartphone to authenticate identity via the contactless card.

In accordance with a further inventive aspect, a non-transitory computer-readable storage medium stores computer programming instructions. When the computer programming instructions are executed by a processor cause the processor to receive confirmation at a programmatic intelligent agent that an identity of a party has been confirmed by a contactless card interaction. The instructions also cause the processor to establish an authenticated messaging session for the with the programmatic intelligent agent with the party. Stored information regarding a secure account of the party is processed to glean an insight regarding the secure account. A message is sent from the programmatic intelligent agent to the party as part of the authenticated messaging session. The message contains information regarding the insight gleaned from processing the stored information regarding the secure account of the party.

The insight may be that there likely has been fraudulent activity with the account. The insight may be that activity in the account differs from historical activity in the secure account. The insight may be that the party could benefit from a service given the information regarding the secure account.

BRIEF DESCRIPTION OF THE DRAWINGS

FIG. 11 depicts an illustrative exchange of messages in an exemplary embodiment.

DETAILED DESCRIPTION

Figure 1:
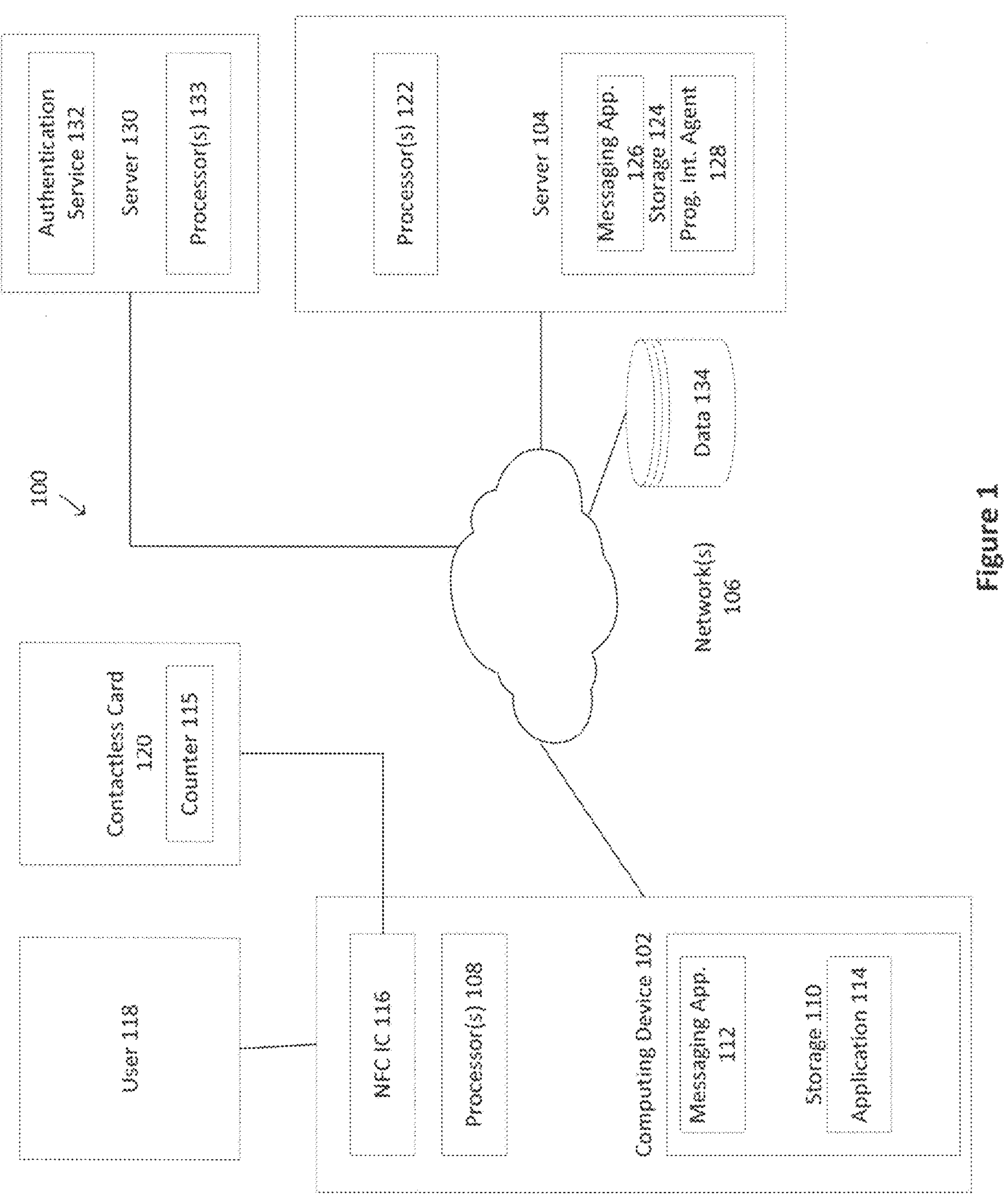
FIG. 1 depicts a block diagram of an illustrative messaging system suitable for exemplary embodiments.

The exemplary embodiments described herein overcome the above-described problems with conventional systems by providing an authenticated messaging environment in which a user can securely message with a programmatic intelligent agent. The user may be authenticated at the prompting of the programmatic intelligent agent, such as the beginning of a messaging session or when the user submits a request that requires access to sensitive or confidential information or requires access to a secure account. The prompt may take the form of a message sent from the programmatic intelligent agent. The message may contain a link for launching code, such as an application, that facilitates authentication of the user's identity. The user may activate the link to launch the code and then perform the steps requested by the code to perform the authentication. By providing the link as part of the messaging session, the programmatic intelligent agent initiates the authentication in the messaging environment. There is no need for the user to exit the messaging application and launch a separate application.

In the exemplary embodiments, the authentication may entail the user using a contactless card. The contactless card may contain information regarding the user and may generate a secure package containing credentials of the user and other information regarding the user. The contactless card may support Near Field Communication (NFC) wireless communications. The user has a device, such as a smartphone with messaging capabilities. The device may have NFC capabilities, and the user may be required to tap the contactless card with an NFC reader in the device to cause information to be extracted from the contactless card, such as credentials and other information for the secure package. The secure package may be sent via a connection, such as a wireless phone connection, to an authentication service. The authentication service receives the secure package, extracts the credentials and information regarding the user from the secure package and attempts to authenticate the identity of the user based at least in part on the extracted information. The result of the authentication may be communicated from the authentication service to the programmatic intelligent agent. If the result is that the identity of the user is authenticated, the programmatic intelligent agent may begin an authenticated messaging session with the user. If result is that the identity of the user is not authenticated, the programmatic intelligent agent may indicate that the authentication has failed and refuse to initiate an authenticated messaging session.

The authenticated messaging session may have an associated expiration time. Once the expiration time is reached, the authenticated messaging session ends. The programmatic intelligent agent may prompt the user to reauthenticate. This expiration provides an added degree of security to ensure that an imposter has not taken over the session. Moreover, the expiration time ensures that the session does not continue indefinitely with little activity. Such an extended messaging session poses a security risk.

The programmatic intelligent agent may process data associated with the user and/or an account of the user. The processing of the data may yield insights that may be shared with the user. For example, the programmatic intelligent agent may process the data to identify that there is suspicious activity in an account of the user, such as a large withdrawal, and generate a message as part of the authenticated messaging session flagging the suspicious activity to the user. As another example, the processing of the data may yield that the user is spending more than usual that month. The programmatic intelligent agent may generate a message as part of the authenticated messaging session noting this unusual activity. As a final example, the processing may indicate that the user may be a candidate for refinancing of their mortgage. The programmatic intelligent agent may send a message to the user as part of the authenticated messaging session indicating that the user may save money by refinancing and may present refinancing options.

Figure 2:
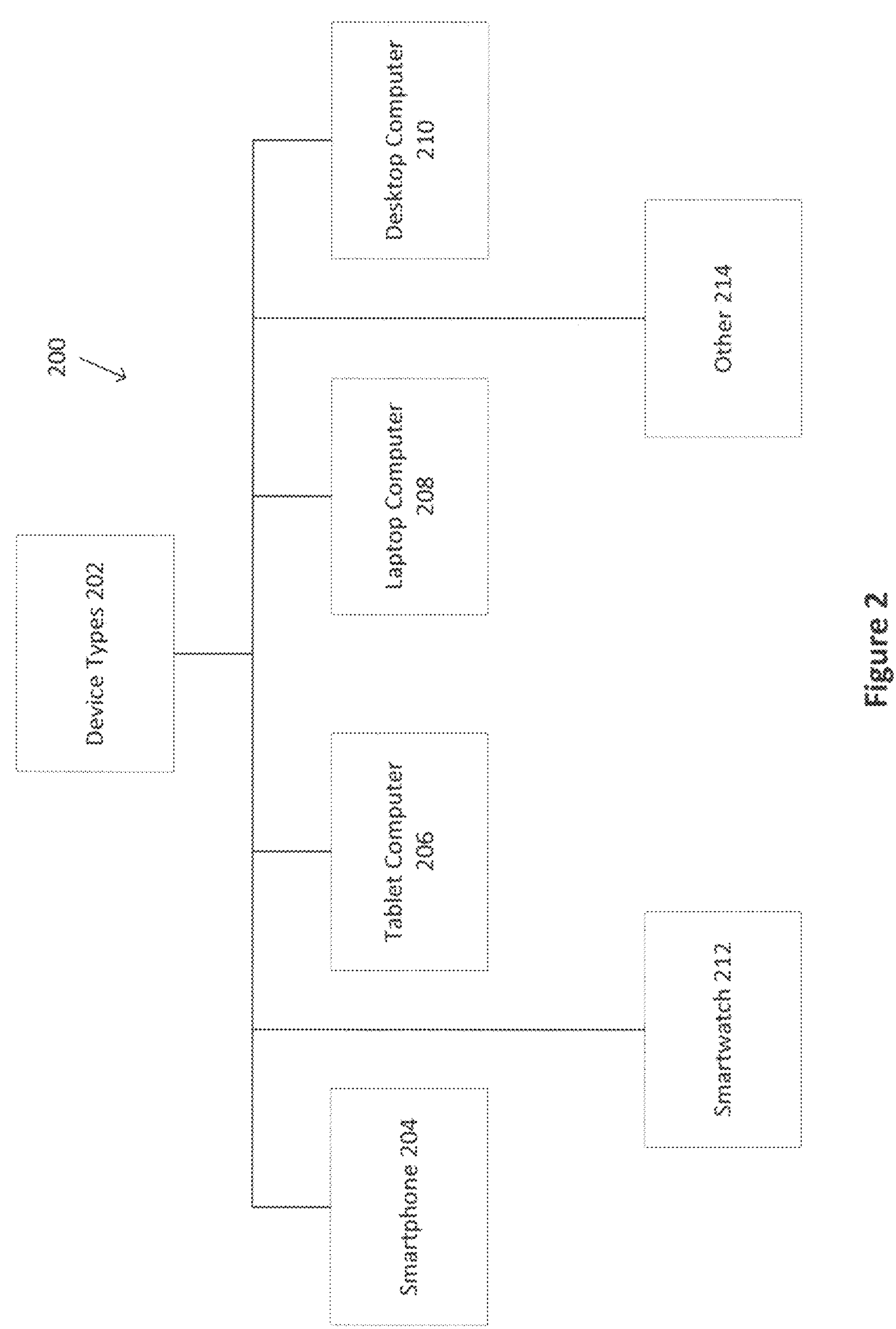
FIG. 2 depicts a diagram illustrating different type of devices a user may use to participate in an authenticated messaging session in exemplary embodiments.

FIG. 1 depicts a block diagram of a messaging environment 100 suitable for exemplary embodiments. The messaging environment 100 includes a computing device 102 that a user 118 uses to communicate with a programmatic intelligent agent 128 via a messaging service. The computing device 102 may be any of a number of different types of devices that support such messaging via the messaging service. FIG. 2 depicts a diagram 200 of different device types 202 that may be used by a user 118 in the exemplary embodiments. For instance, the computing device 102 may be a smartphone 204 or a smartwatch 212 with messaging capability. The computing device may be a tablet computer 206 with messaging capability. The computing device 102 may be a laptop computer 208 or a desktop computer with messaging capability. The computing device 102 may also be another type of computing device 214. The computing device 102 should have a messaging capability and should support interaction with a contactless card 120, such as through NFC. The contactless card 120 may store a synchronized counter 115 that may be used in encryption as will be explained below.

The computing device 102 may include one or more processors 108. Each processor 108 may execute instructions to perform functionality described herein. Each processor 108 may be a Central Processing Unit (CPU), a Graphics Processing Unit (GPU), an Application Specific Integrated Circuit (ASIC), a Field Programmable Gate Array (FPGA) or a controller with processing capabilities.

The computing device 102 may include a storage 110. The storage 110 may include one or more memory and storage devices, including but not limited to both primary and secondary storage devices, such as Random Access Memory (RAM) devices, Read Only Memory (ROM) devices, solid state memory devices, flash memory devices, registers, magnetic memory devices, optical memory devices and other types of non-transitory computer readable storage media. The storage 110 may hold computer programming instructions for a messaging application, such as a SMS messaging application, an instant messaging application, a social media messaging application, a chat application or other variety of messaging service. The storage 110 may hold an application 114. The application 114 enables a user to gain access to a web server for a given entity, such as a merchant, financial institution, brokerage house, or other variety of institution. The application 114 is the code that is launched to facilitate authentication of the identity of the user 118. For example, the application 114 may be an application for a financial institution that enables a user to perform financial transactions and access information regarding an account of the user 118.

The computing device 102 also may include an integrated circuit (IC) that provides NFC capabilities 116. This may be any of a number NFC IC's that are commercially available, such as those found in NFC-compatible phones. The NFC IC 116 has an NFC reader which is able to read a contactless card 120 of the user 118. The NFC IC 116 also includes a coil antenna. As will be described below, the contactless card 120 may hold credentials for the user 118 and user information that may be communicated via a contactless wireless protocol like NFC.

The messaging environment 100 also includes a server 104. The computing device 102 may communicate with the server 104 via one or more networks 106. The network(s) 106 may include the Internet, one or more Local Area Networks (LANs), cellular phone networks and/or wireless networks, such as WiFi (IEEE 802.11) networks. The server 104 is a computing device that includes processor(s) 122 for executing computer programming instructions. The processor(s) may take the form of processor described above relative processor(s) 108. The server 104 may provide cloud services that are accessible to the user 118 via the computing device 102.

The server 104 includes storage 124. The storage 124 may include a number of different storage devices and/or memory devices of the types, such as described above regarding storage 110. The storage 124 may store a messaging application 126 and a programmatic intelligent agent 128 that may be executed by the processor(s) 122 to provide the functionality described herein. The messaging application 126 enables the programmatic intelligent agent 128 to participate in a messaging service, such as an SMS or other type of messaging service as detailed above. The programmatic intelligent agent 128 is an agent implemented with computer programming instructions that may perform intelligent tasks as described herein. The programmatic intelligent agent 128 possesses a natural language capability to generate textual messages and to respond to textual messages appropriately. The programmatic intelligent agent 128 is designed to seem human-like in its interactions. The programmatic intelligent agent 128 parses received messages, extracts meaning from the received messages and generates appropriate responses. The programmatic intelligent agent 128 may be realized as a chatbot. As will be described below, the programmatic intelligent agent 128 may process data 134 stored in a database or elsewhere concerning the user 118 and/or user accounts. The programmatic intelligent agent 128 may initiate transactions, such as in user accounts and has clearance to access confidential and sensitive information regarding the user and/or user account. The processing may yield insights and other information that may guide messaging service interactions with the user 118.

An authentication service 132 may be provided on another server 130 that is accessible by the user 118 via the network(s) 106. In some embodiments, the authentication service 132 may be resident on server 104 rather than a separate server 130. The authentication service 132 is responsible for authenticating the identity of a party, like the user 118, so that an authenticated messaging session between the user 118 and the programmatic intelligent agent 128 may be conducted. The server 130 may include one or more processors 133 on which the authentication service 132 runs.

Figure 3A:
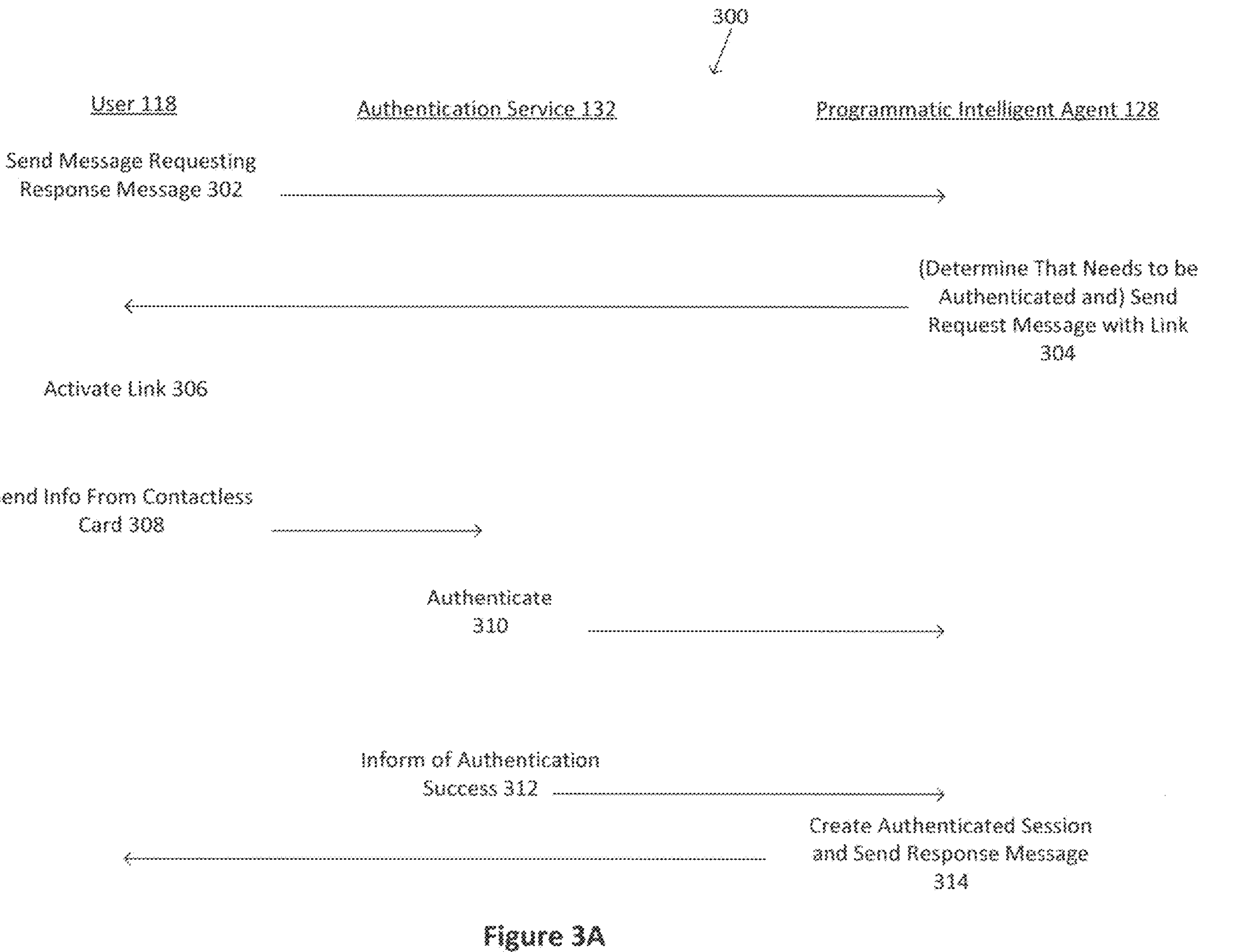
FIG. 3A depicts actions that may be taken for a successful authentication of the user per exemplary embodiments.

When the user 118 wishes to initiate a messaging session with the programmatic intelligent agent 128, the user uses the messaging application 112 to send a message via the messaging service to the programmatic intelligent agent 128 as shown by 302 in FIG. 3A. The sent message requests a response from the programmatic intelligent agent 128. Suppose, for example, that user 118 wishes to know the routing number for a financial institution where the user has an account. The user 118 might send a message with a simple question like "What is my routing number?". The programmatic intelligent agent 128 may process the message to determine if the message requests access to confidential or sensitive information or access to a secure account and if the message does, may determine that the identity of the user needs to be authenticated. In other cases, this step of determining that authentication is needed is not performed. Instead, the first message of a session prompts a request for authentication. The programmatic intelligent agent 128 sends a request message back to the user 118 requesting that the user authenticate using the contactless card 120 as shown by 304. The request message contains a link to launch code on the computing device 102 that may be used for the user to authenticate using the contactless card 120. The code may be the application 114. For the example set forth above, the application may be for a financial institution.

The user 118 receives the link in the request message and activates the application 114 as indicated by 306. This approach makes is easy for the user 118 to authenticate while in the messaging session. There is no need to exit the messaging session and manually log into the application 114. The launched application 114 prompts the user 118 to touch the contactless card 120 to the NFC reader in the NFC IC 116 on the computing device.

Figure 4A:
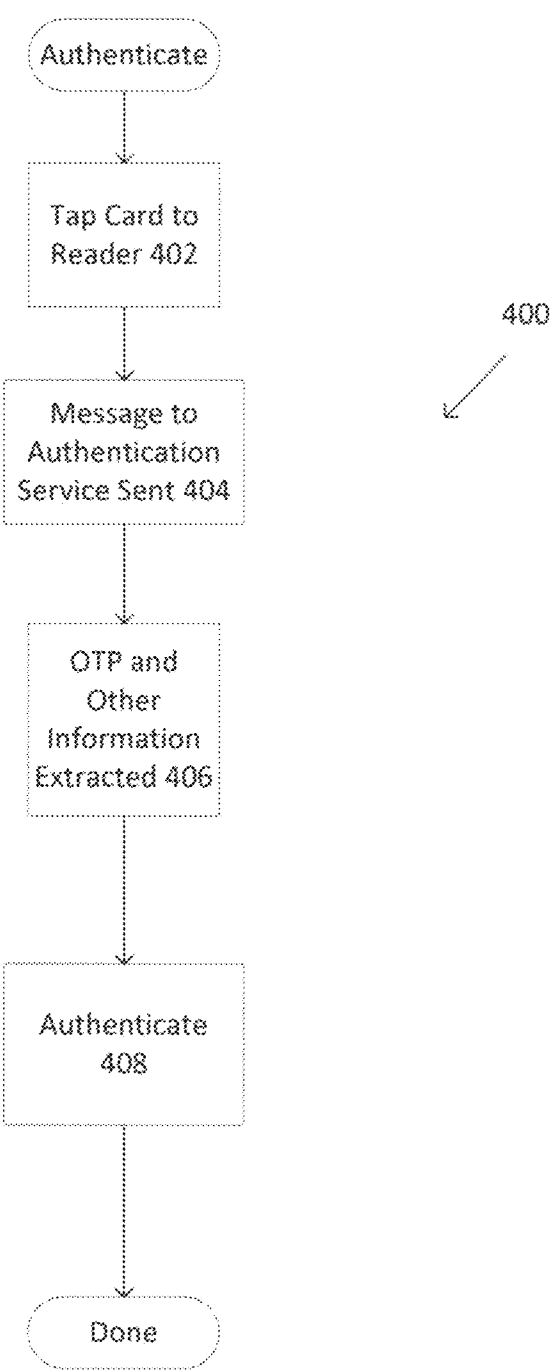
FIG. 4A depicts a flowchart of steps that may be performed in exemplary embodiments in authenticating the identity of the user.
Figure 4B:
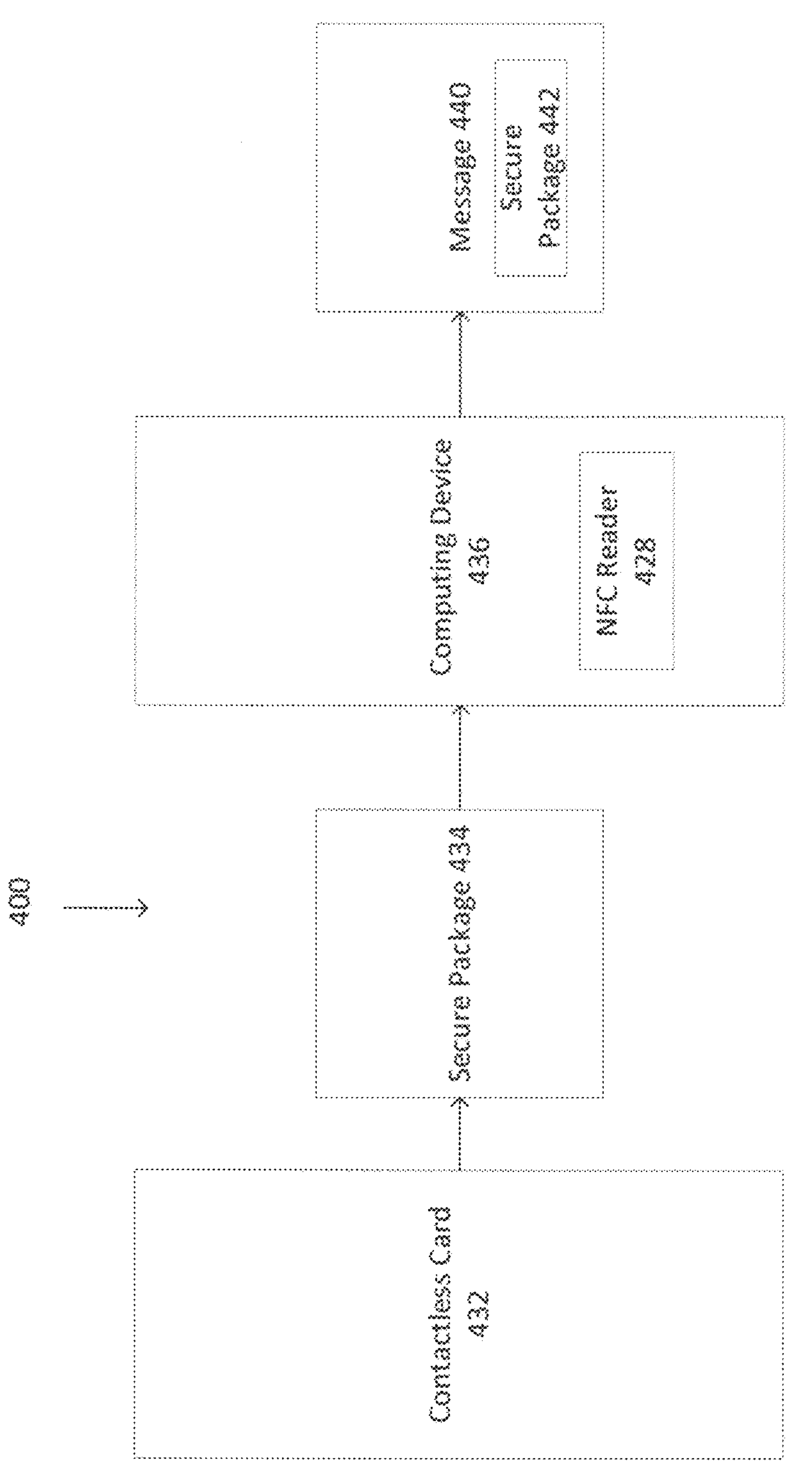
FIG. 4B depicts a block diagram of components that may be part of the authentication of the user on the user side of the messaging system in exemplary embodiments.

FIG. 4A shows a flowchart of the steps that may be performed in an exemplary embodiment to authenticate an initiating party that wishes to initiate a secure messaging service session with a non-initiating party. The steps are described below relative FIG. 4B. The process may begin with a user tapping a contactless card 432 (see FIG. 4A) to an NFC reader 428 in the computing device 436 (see 402). The tapping initiates an NFC communication session between the contactless card 432 and the NFC reader 428 in the computing device 436. In other instances, the contactless card 432 need not tap the NFC reader 428 but rather may need only be in sufficient proximity to the NFC reader 428 to initiate an NFC communication session. In the NFC communication session, a secure package 434 is sent from the contactless card 432 to computing device 436. Application 114 is running on the computing device 436 and receives the secure package 434. The application 114 generate a message 440 to the authentication service 132 encapsulating the secure package 442. The message 440 serves as a request to initiate an authenticated messaging system, and the message 440 is sent to the authentication service 132 (see 404 in FIG. 4A).

The authentication service 132 extracts information from the secure package and uses the package to authenticate the identity of the user as indicated by 408 in FIG. 4A and by 310 in FIG. 3A. The details of the secure package 434 and the contactless card 432 will be discussed below.

Where the authentication is successful, as shown in FIG. 3A, the authentication service 132 informs the programmatic intelligent agent 128 that the authentication was successful as indicated by 312. The programmatic intelligent agent 128 may then create an authenticated messaging session and send a response message back to the user 118. For instance, the programmatic intelligent agent 128 may advise the user 118 that the authentication was successful and provide the requested response.

Figure 3B:
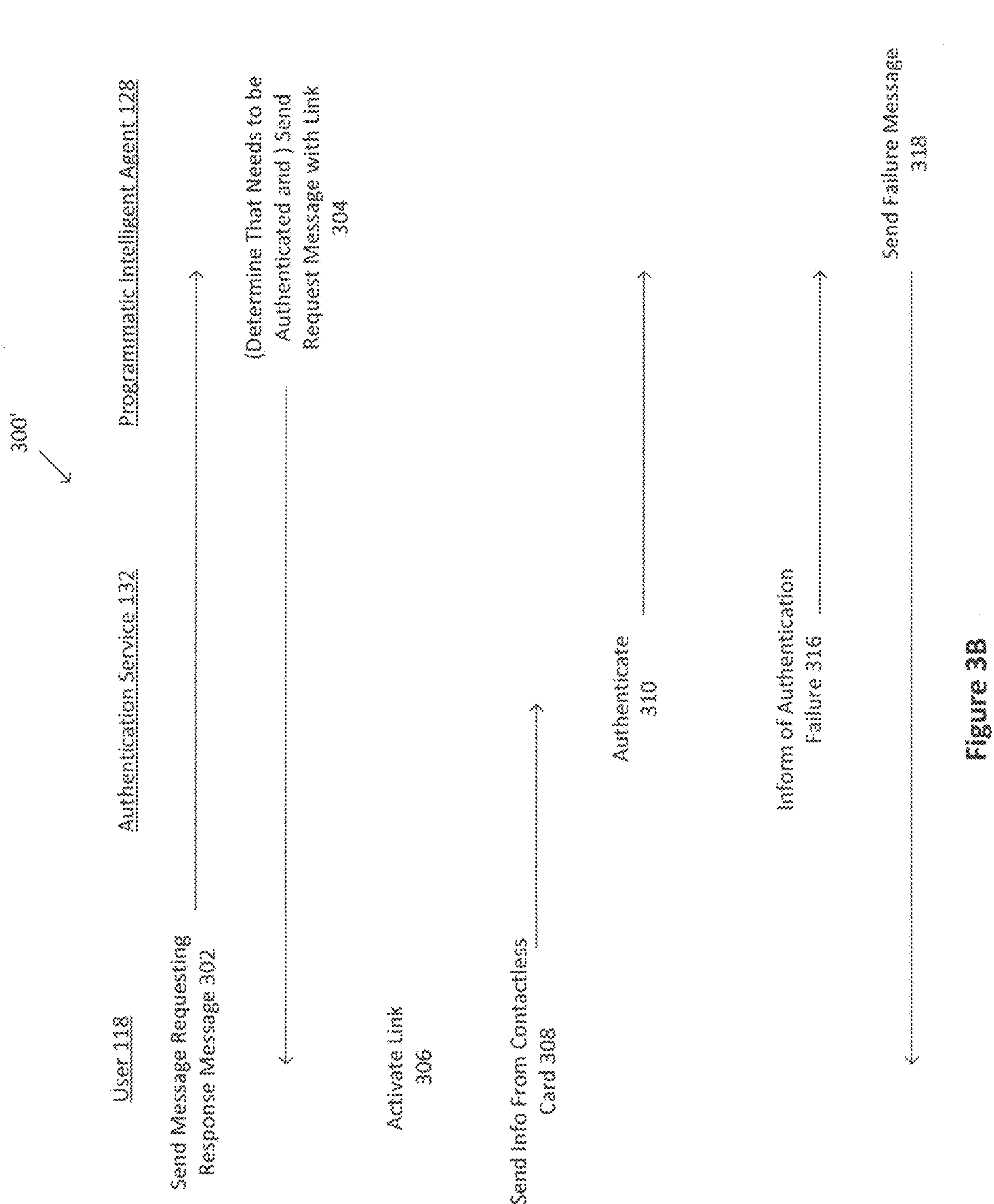
FIG. 3B depicts actions that may be taken for an unsuccessful authentication of a user per exemplary embodiments.

FIG. 3B shows the steps that may be performed when the authentication is unsuccessful. The steps 302, 304, 306, 308 and 310 are the same as in FIG. 3A. However, the authentication in 310 is unsuccessful. Thus, the authentication service 132 informs the programmatic intelligent agent 128 that the authentication failed as indicated by 316. The programmatic intelligent agent 128 does not create an authenticated messaging session and does not send the requested response to the initial message from the user 118. Instead, the programmatic intelligent agent 128 send a failure message to the user 118 as indicated by 318.

Figure 5A:
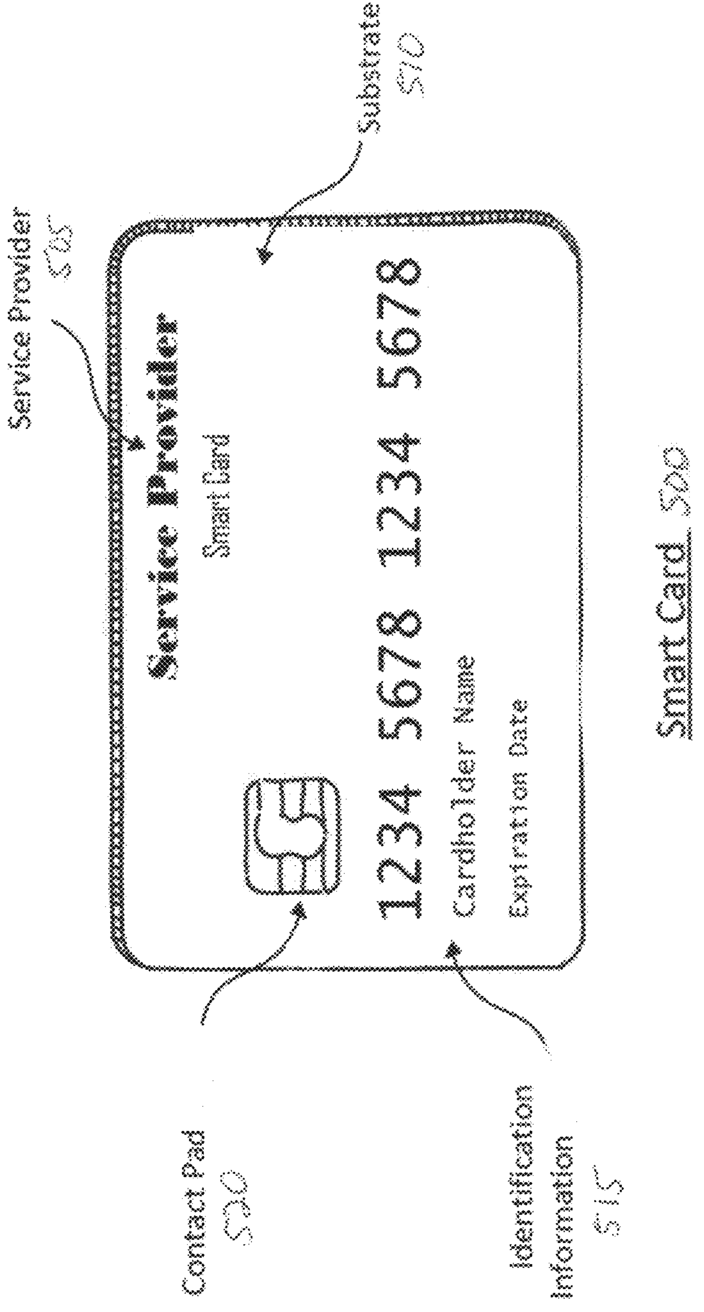
FIGS. 5A and 5B depicts an illustrative contactless card that may be used in exemplary embodiments.

FIG. 5A illustrates an example of a contactless card 500, which may be a payment card, such as a credit card, a debit card, or a gift card, issued by a service provider 505, such as a merchant, financial institution, etc., displayed on the front or back of the card 500. In some exemplary embodiments, the contactless card 500 is not related to a payment card, and may comprise, without limitation, an identification card. In some instances, the payment card may comprise a dual interface contactless payment card. The contactless card 500 may comprise a substrate 510, which may include a single layer or laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 500 may have physical characteristics compliant with the ID-1 format of the ISO/IEC 7810 standard, and the contactless card 500 may otherwise be compliant with the ISO/IEC 14443 standard. However, it is understood that the contactless card 500 according to the present disclosure may have different characteristics, and the present disclosure does not require a contactless card to be implemented in a payment card.

The contactless card 500 may also include identification information 515 displayed on the front and/or back of the card, and a contact pad 520. The contact pad 520 may be configured to establish contact with another communication device, such as a user device, smart phone, laptop, desktop, or tablet computer. The contactless card 500 may also include processing circuitry, antenna and other components not shown in FIG. 5A. These components may be located behind the contact pad 520 or elsewhere on the substrate 510. The contactless card 500 may also include a magnetic strip or tape, which may be located on the back of the card (not shown in FIG. 5A).

Figure 5B:
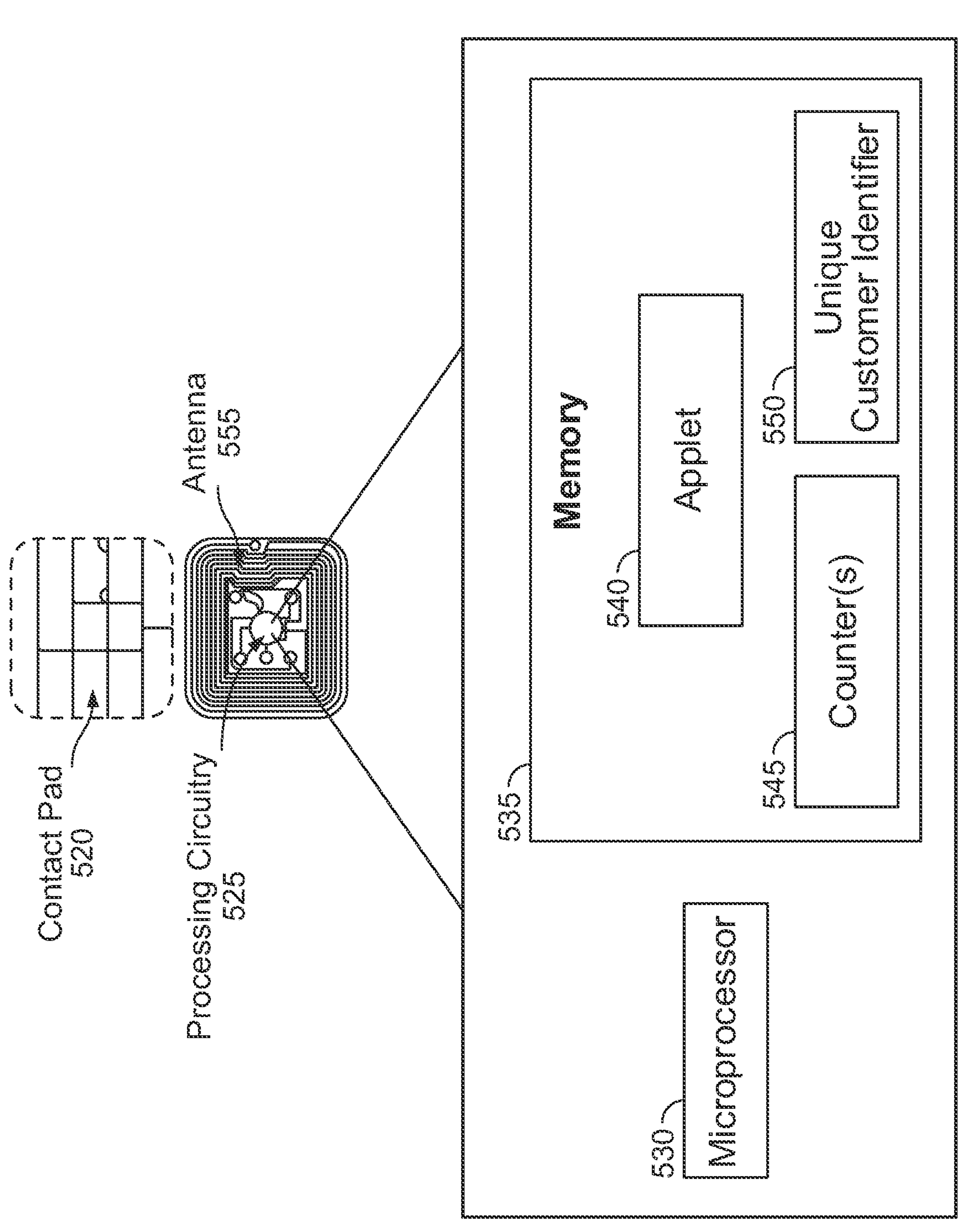

As illustrated in FIG. 5B, the contact pad 520 of FIG. 5A may include processing circuitry 525 for storing and processing information, including a microprocessor 530 and a memory 535. It is understood that the processing circuitry 525 may contain additional components, including processors, memories, error and parity/CRC checkers, data encoders, anti-collision algorithms, controllers, command decoders, security primitives and tamper proofing hardware, as necessary to perform the functions described herein.

The memory 535 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 535 may be configured to store one or more applets 540, one or more counters 545, and a customer identifier 550. The one or more applets 540 may comprise one or more software applications configured to execute on one or more contactless cards, such as Java Card applet. However, it is understood that applets 540 are not limited to Java Card applets, and instead may be any software application operable on contactless cards or other devices having limited memory. The one or more counters 545 may comprise a numeric counter sufficient to store an integer. The customer identifier 550 may comprise a unique alphanumeric identifier assigned to a user of the contactless card 500, and the identifier may distinguish the user of the contactless card from other contactless card users. In some examples, the customer identifier 550 may identify both a customer and an account assigned to that customer and may further identify the contactless card associated with the customer's account.

The processor 530 and memory 535 elements of the foregoing exemplary embodiments are described with reference to the contact pad, but the present disclosure is not limited thereto. It is understood that these elements may be implemented outside of the pad 520 or entirely separate from it, or as further elements in addition to processor 530 and memory 535 elements located within the contact pad 520.

In some examples, the contactless card 500 may comprise one or more antennas 555. The one or more antennas 555 may be placed within the contactless card 500 and around the processing circuitry 525 of the contact pad 520. For example, the one or more antennas 555 may be integral with the processing circuitry 525 and the one or more antennas 555 may be used with an external booster coil. As another example, the one or more antennas 555 may be external to the contact pad 520 and the processing circuitry 525.

In an embodiment, the coil of contactless card 500 may act as the secondary of an air core transformer. The terminal may communicate with the contactless card 500 by cutting power or amplitude modulation. The contactless card 500 may infer the data transmitted from the terminal using the gaps in the contactless card's power connection, which may be functionally maintained through one or more capacitors. The contactless card 500 may communicate back by switching a load on the contactless card's coil or load modulation. Load modulation may be detected in the terminal's coil through interference.

As explained above, the contactless card 500 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 6A:
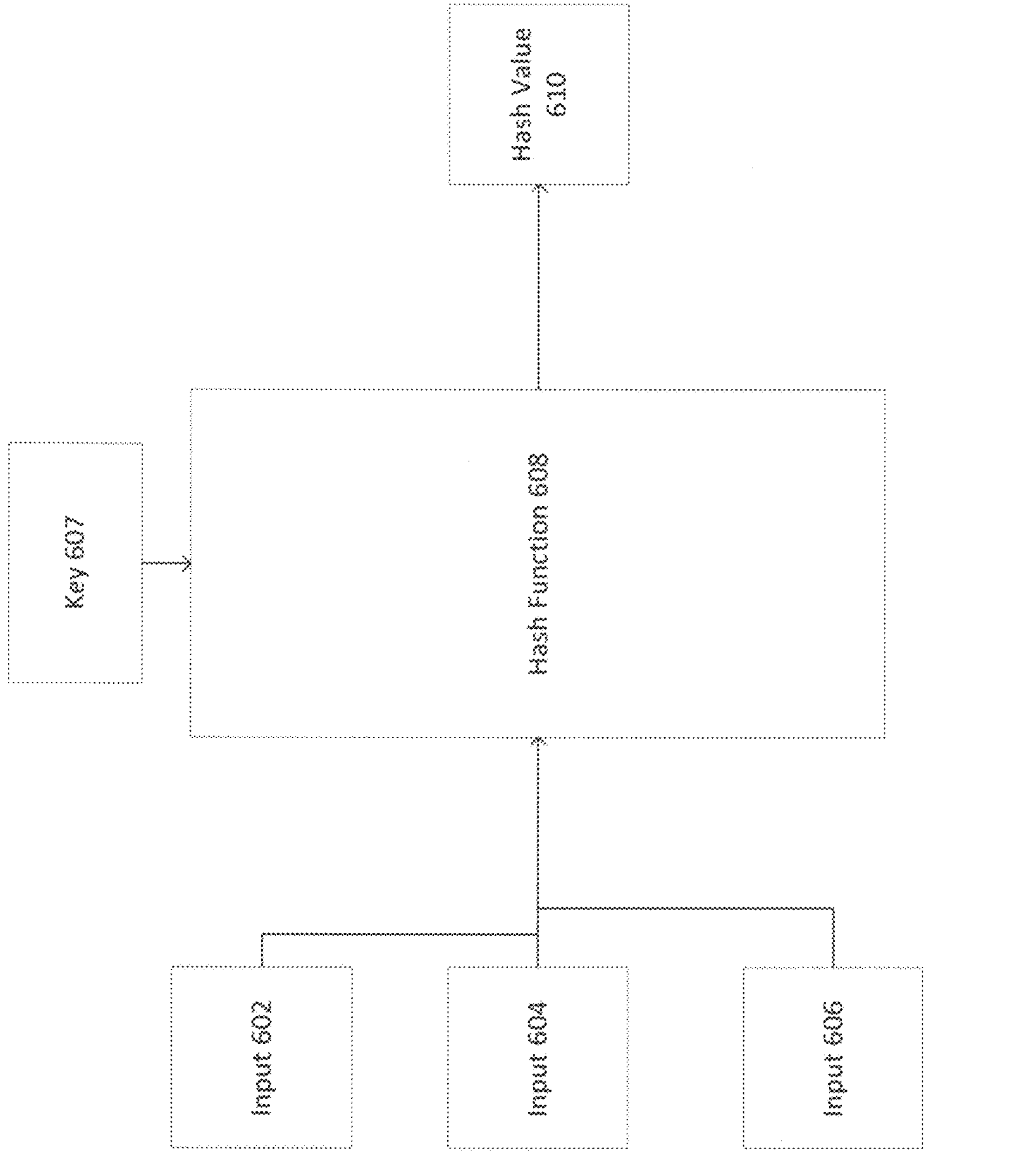
FIG. 6A depicts inputs and outputs of a hash function that may be used to create a hash value for securing information for a secure package in exemplary embodiments.

The generation of the secure package 434 (FIG. 4B) may employ cryptographic hash functions, such as MD5 or SHA-1. FIG. 6A shows a block diagram 600 depicting how the cryptographic hash functions may be used in exemplary embodiments. In the example shown in FIG. 6A, three inputs 602, 604 and 606 are passed through a hash function 608 together. The choice of depicting three inputs is intended to be illustrative and not limiting. Other number of inputs may be used in some instances. The hash function 608 produces an output hash value 610. Due to the nature of the hash function 608, it is computationally difficult to derive the inputs 602, 604 and 606 from the hash value 610 without knowing the key 607 used by the hash function 608. The key 607 is kept secret. The key 607 may be dynamically generated for each session and may be particular to the contactless card. Thus, the hash function 608 provides a layer of security for the content (e.g., inputs 602, 604 and 606) that is included in the secure package 404.

Figure 6B:
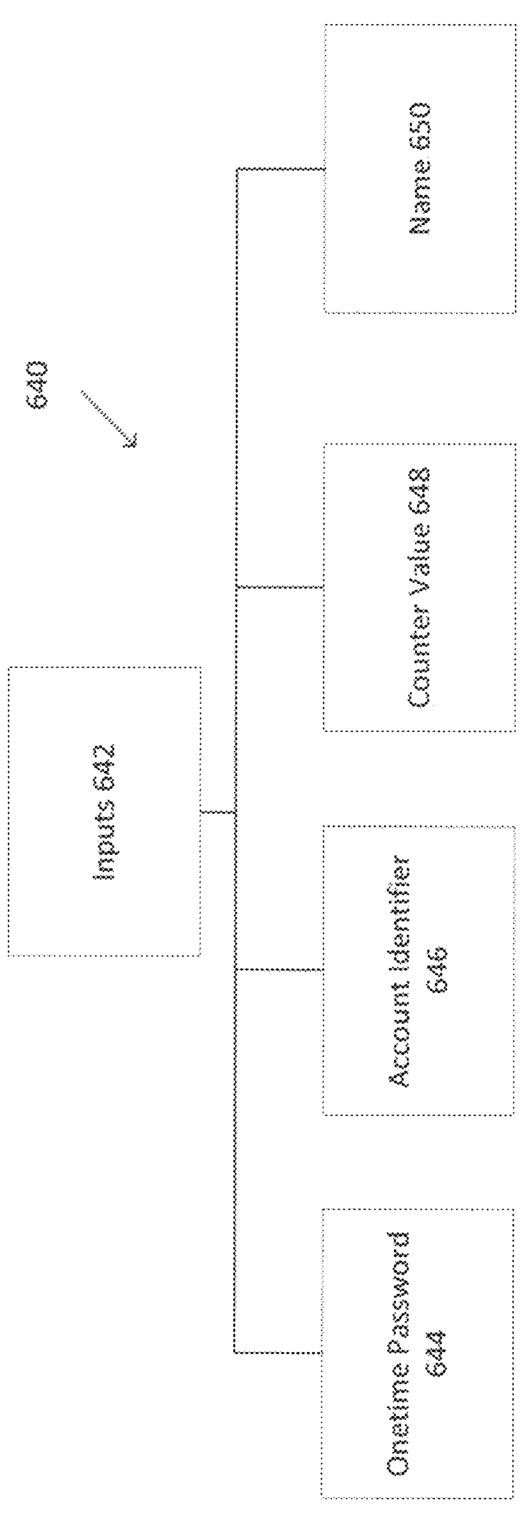
FIG. 6B depicts different types of inputs that may be fed into the hash function in exemplary embodiments.

In the exemplary embodiments, the inputs 602, 604 and 606 may vary depending on the information the parties wish to exchange and the protocol for authenticating the initiating party. FIG. 6B, shows a diagram 640 of possible types of inputs 642 that may be hashed in exemplary embodiments. In these exemplary embodiments, a onetime password 644 generated by the contactless card may be included as an input. An account identifier 646 for the initiating party may be provided. This may be an account number or other identifier that uniquely identifies the account of the initiating party. The account identifier 646 may be a phone number for the initiating party. In some cases, the phone number of the initiating party may not be included in the hash value 610 but may be derived from the message sent from the computing device 102. The inputs 642 may include a counter value and/or a name 650 of the initiating party.

Figure 7:
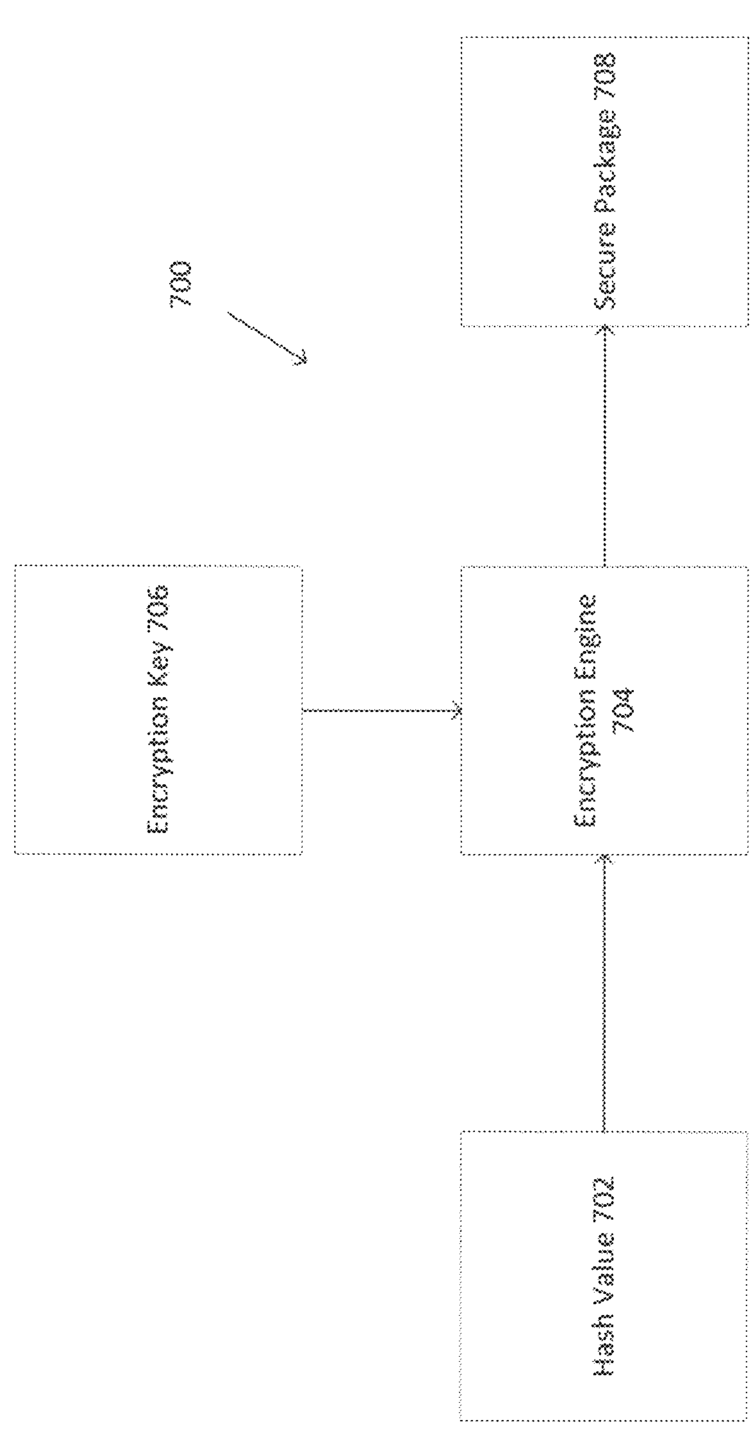
FIG. 7 depicts the creation of a secure package in exemplary embodiments.
Figure 7:

As an added layer of security, the hash value 610 may be encrypted. FIG. 7 shows a block diagram 700 depicting such encryption. The hash value 702 generated as discussed above is passed to an encryption engine 704 that encrypts the hash value using an encryption key 706. The resulting output is the secure package 708. The encryption engine 704 may use any of a number of cryptographic algorithms, such as DES, AES, RSA, DSA or the like. These may be symmetric cryptographic algorithms like DES and AES or asymmetric cryptographic algorithms like RSA and DSA. It is presumed that the authentication service 132 possesses the appropriate key to decrypt the secure package. Although not shown in FIG. 7, other content may be encrypted in conjunction with the hash value 702.

Figure 8:
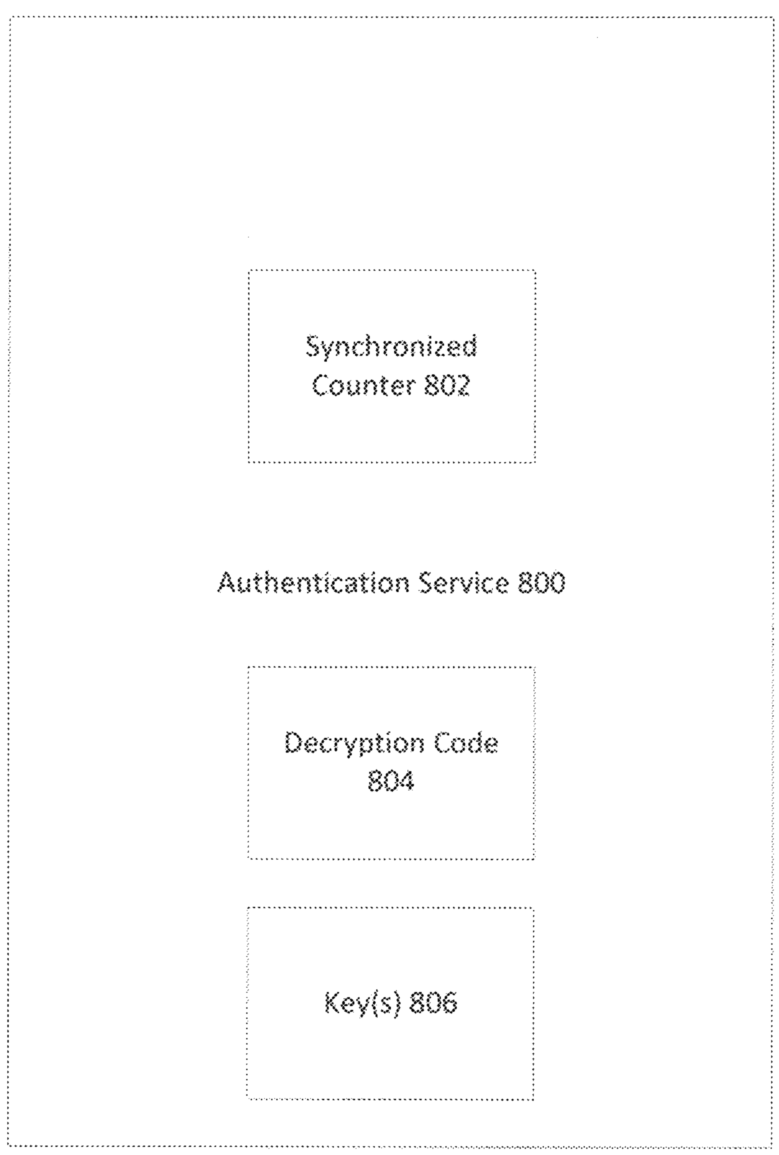
FIG. 8 depicts certain information stored and used by the authentication service in exemplary embodiments.

FIG. 8 depicts certain items stored as part of the authentication service 132. These items include a synchronized counter 802 that may be used in decryption/encryption operations. The authentication service includes decryption code for performing decryption operations on the secure package 434. The authentication service 132 may also store a number of decryption keys and encryption keys 806.

Generally, the server 130 (or another computing device) and the contactless card 432 may be provisioned with the same master key (also referred to as a master symmetric key). More specifically, each contactless card 432 may be programmed with a distinct master key that has a corresponding pair in the authentication service 132. For example, when a contactless card 432 is manufactured, a unique master key may be programmed into the memory 535 of the contactless card 432. Similarly, the unique master key may be stored in a record of a customer associated with the contactless card 432 in the account information accessible by the authentication service 132 (and/or stored in a different secure location). The master key may be kept secret from all parties other than the contactless card 500 and authentication service 132, thereby enhancing security of the system.

The master keys may be used in conjunction with the counters to enhance security using key diversification. The counters 115 and 802 comprise values that are synchronized between the contactless card 120 and the authentication service 132. The counter value may comprise a number that changes each time data is exchanged between the contactless card 120 and the authentication service 132.

After communication has been established between computing device 102 and the contactless card 120, the contactless card 120 may generate a message authentication code (MAC) cryptogram. In some examples, this may occur when the contactless card 120 is read. In particular, this may occur upon a read, such as an NFC read, of a near field data exchange (NDEF) tag, which may be created in accordance with the NFC Data Exchange Format. For example, a reader, such as the NFC reader, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value 115 maintained by the contactless card 120 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 120 may then transmit the MAC cryptogram to the computing device 102, which may then forward the MAC cryptogram to the authentication service 132 for verification as explained below. However, in some embodiments, the computing device 102 may verify the MAC cryptogram.

More generally, when preparing to send data (e.g., to the server 130 and/or the computing device 436), the contactless card 120 may increment the counter 115. The contactless card 120 may then provide the master key and counter value as input to a cryptographic algorithm, which produces a diversified key as output. The cryptographic algorithm may include encryption algorithms, hash-based message authentication code (HMAC) algorithms, cipher-based message authentication code (CMAC) algorithms, and the like. Nonlimiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC.

The contactless card 120 may then encrypt the data (e.g., the customer identifier and any other data) using the diversified key. The contactless card 432 may then transmit the encrypted data to the computing device 102 (e.g., via an NFC connection, Bluetooth connection, etc.). The computing device 102 may then transmit the encrypted data to the authentication service 132 on the server computing device 130 via the network 106. In at least one embodiment, the contactless card 120 transmits the counter value with the encrypted data. In such embodiments, the contactless card 120 may transmit an encrypted counter value, or an unencrypted counter value.

Although the counter is used as an example, other data may be used to secure communications between the contactless card 120, the computing device 102, and/or the authentication service 132. For example, the counter may be replaced with a random nonce, generated each time a new diversified key is needed, the full value of a counter value sent from the contactless card 120 and the authentication service 132, a portion of a counter value sent from the contactless card 120 and the authentication service, a counter independently maintained by the contactless card 120 and the authentication service 132 but not sent between the two, a one-time-passcode exchanged between the contactless card 120 and the authentication service 132, and a cryptographic hash of data. In some examples, one or more portions of the diversified key may be used by the parties to create multiple diversified keys.

Figure 9:
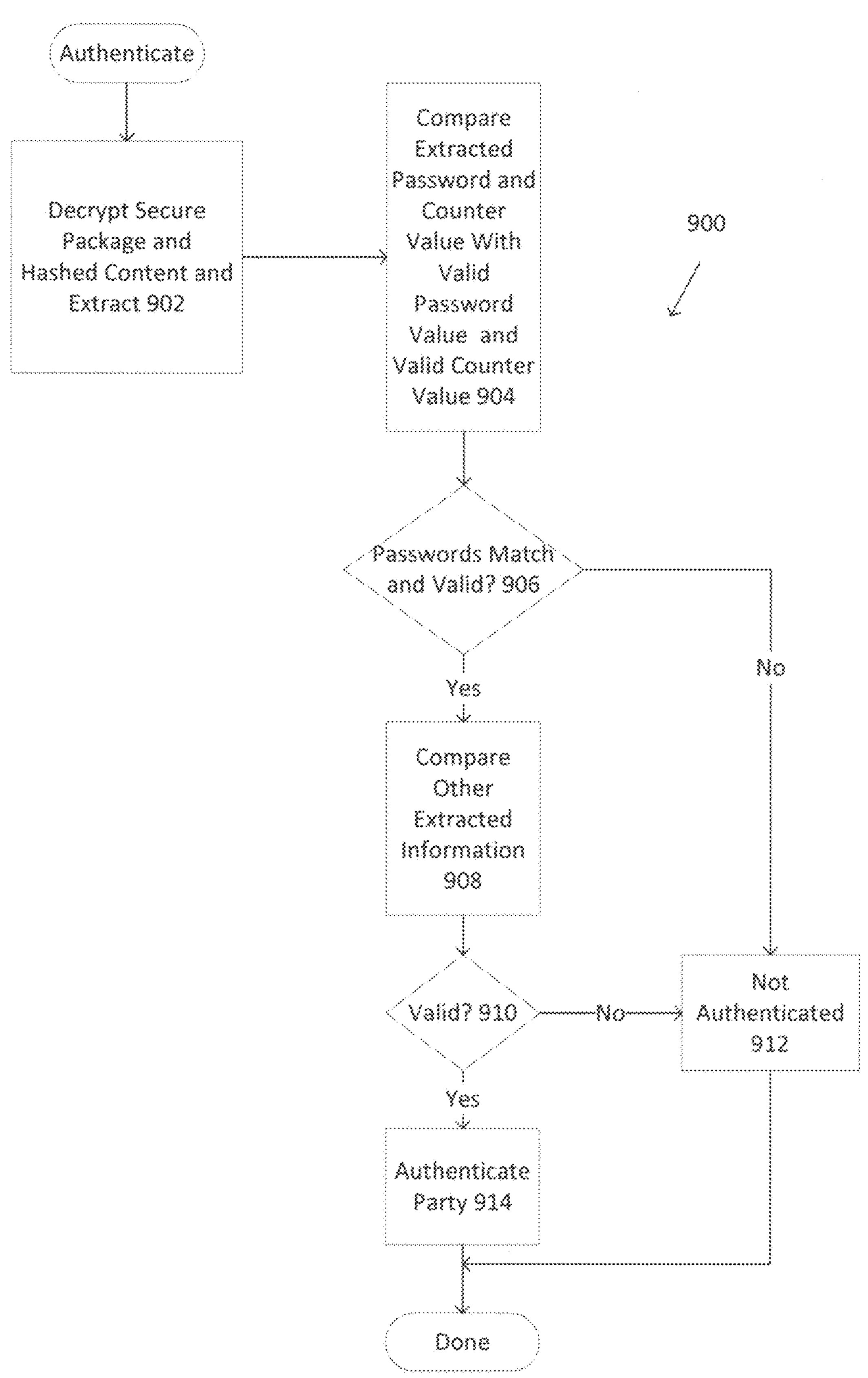
FIG. 9 depicts a flowchart of illustrative steps that may be performed in authenticating the identity of the user in exemplary embodiments.
Figure 10:
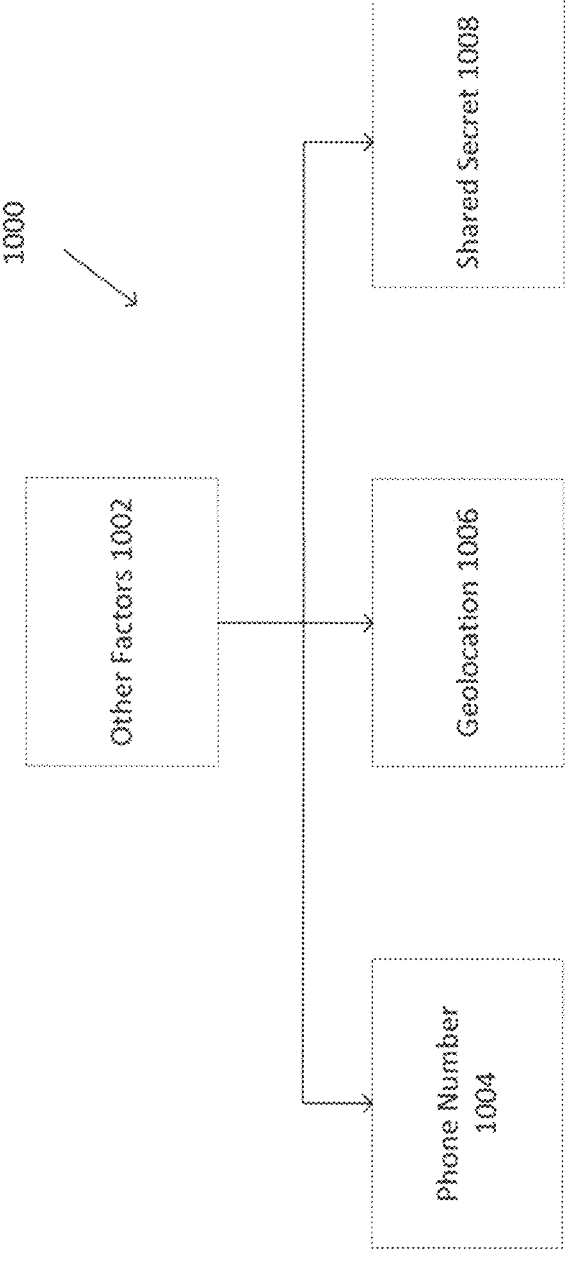
FIG. 10 depicts example of other factors that may be examined in authenticating the identity of the user in exemplary embodiments.

FIG. 9 depicts a flowchart 900 of steps performed to authenticate the initiating party once the authentication message with the secure package has been received by the authentication service 132 as the recipient party. Initially, the authentication service 132 uses the decryption keys 806 to decrypt the secure package. In addition, the decryption keys 806 are used to decrypt the hash to extract the inputs that were hashed together by the hash function 902. The extracted password and counter value may be compared with the valid password and valid counter value 904. A determination is made whether the passwords match and the counter values match or if the extracted counter value otherwise indicates that the password has not expired 906. If the passwords match and the extracted password has not expired based on the extracted counter value, other extracted information may be compared 908.

The other information may be other authentication factors 1002, such as depicted in diagram 1000 of FIG. 9. The other authentication factors 1002 may include the phone number 1004 of the computing device 102, which may be compared to the phone number on record for the user 118. The other authentication factors 1002 may include a geolocation 1006 for the user 118. The geolocation 1006 may be information such as GPS information or area code and exchange prefix information that may be compared with information regarding the residence of the user 118. The other authentication factors 1002 may include a shared secret that is shared between the user 118 and the authentication service 132.

With reference to FIG. 9 again, if the other information is valid 910, then the user 118 may be authenticated 914. If not, the user 118 is not authenticated 912. Similarly, if the passwords do not match or the password has expired as indicated by the extracted counter value, the user 118 is not authenticated 912.

FIG. 11 depicts an example of messages that may be exchanged between the user 118 and the programmatic intelligent agent 128 in a successful authentication. First, the user 118 sends an initial message 1120 to the programmatic intelligent agent 128. In this example, the user 118 asks for the routing number of the bank. The programmatic intelligent agent 128 determines that authentication is needed and send a link in a message 1122 to launch code for authentication. The user 118 successfully authenticates, and the programmatic intelligent agent 128 sends a message 1124 indicating that the authentication was successful. In addition, the programmatic intelligent agent 128 sends response message 1126 with the requested routing number.

Once the user 118 has been successfully authenticated, the user 118 may conduct an authenticated messaging session with the programmatic intelligent agent 128. The programmatic intelligent agent 128 may answer questions of the user 118, provide information to the user 118 and even perform transactions with the user 118, such as financial transactions.

In order to provide added security, each authenticated messaging session may have an associated expiration time (such as fifteen minutes after starting). This expiration provides an added degree of security to ensure that an imposter has not taken over the session. Moreover, the expiration time ensures that the session does not continue indefinitely with little activity. Such an extended messaging session may pose a security risk.

Figure 12:
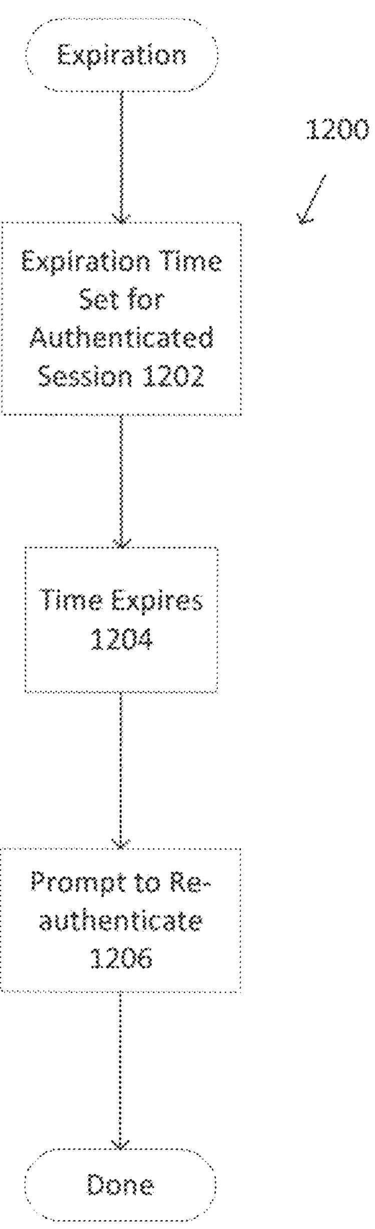
FIG. 12 depicts a flowchart of illustrative steps that may be performed in relation to expiration of an authenticated messaging session in exemplary embodiments.

FIG. 12 depicts a flowchart 1200 of steps that may be performed regarding such expiration times. Initially, the programmatic intelligent agent 128 establishes an expiration time for a newly created authenticated messaging session 1202. The expiration time may be standard amount, such as fifteen minutes after start, or may be tailored to how much traffic is being handled (e.g., shorter expiration times at busy dates/times). The expiration times may even be varied based on the particulars of the customer, like history, location, etc. Eventually, time expires 1204, and the user 118 may be prompted to re-authenticate 1206.

The programmatic intelligent agent 128 may process data 134 about the user 118 and/or an account of the user 118 to glean insights that may be shared with the user 118. The programmatic intelligent agent 128 may contain pattern matching capabilities and may have intelligence encoded to react to certain patterns in the data 134. The programmatic intelligent agent 128 may include machine learning capabilities.

Figure 13:
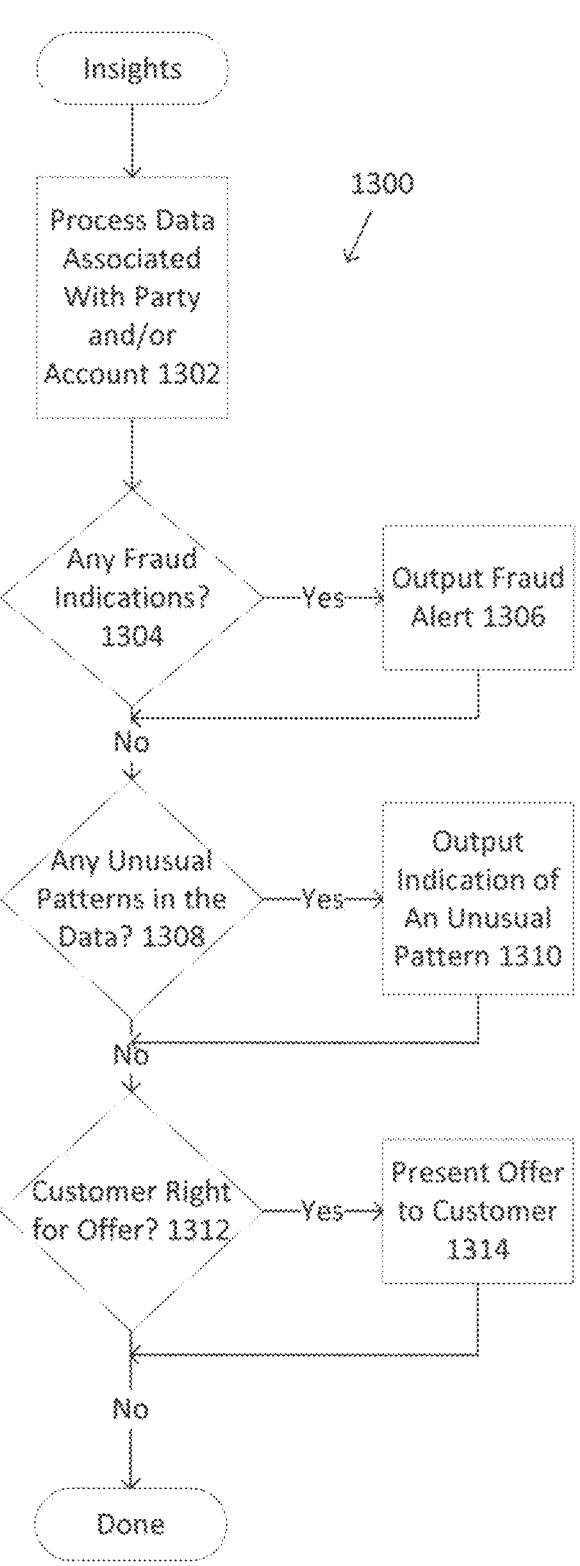
FIG. 13 depicts a flowchart of steps that may be performed in identifying and outputting insights gleaned by processing data regarding a user or a user account in exemplary embodiments.
Figure 14A:
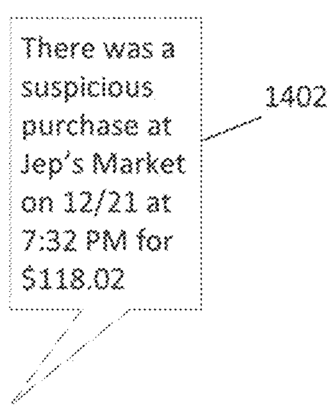
FIGS. 14A, 14B and 14C depicts example of messages that may be output to share insights gained by processing data regarding the user or user account in exemplary embodiments.
Figure 14B:
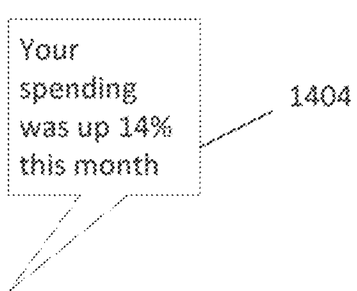

FIG. 13 depicts a flowchart 1300 of illustrative steps that may be performed with respect to such processing of the data 134 and informing the user 118 of gleaned insights. The steps depicted in the flowchart 130 are intended to be illustrative and not limiting. Only a few illustrative cases of insights are covered in the flowchart 1300. Initially, the programmatic intelligent agent 128 or a module acting on its behalf processes the data 134 to identify patterns and gain insights 1302. A first pattern that the programmatic intelligent agent may find is one indicative of fraudulent activity 1304. For example, the programmatic intelligent agent may notice that the user 118 shopped at a store that user 118 does not usually shop at or that the store is away from where the user frequents. The programmatic intelligent agent 128 outputs a fraud alert 1306 to the user 118. The fraud alert may, for example, look like the message 1402 of FIG. 14A. That message 1402 asks the user if they made a purchase for a given amount at a particular store.

Figure 14C:

The programmatic intelligent agent 128 may also check 1306 if there are any unusual patterns in the data that are worth calling to the attention of the user 118. If there are, the programmatic intelligent agent 128 may generate a message that identifies the unusual activity 1310. For example, a message like message 1404 may be generated to note that the spending of the user 118 is up 14% in the latest month. A further pattern that may be identified by the processing of the data is one that indicates that the user 118 is a good candidate for an offer 1312, such as a coupon or an offer for services or a product. FIG. 14C, shows an illustrative message that may be generated and sent to the user 118. In this instance, the processing may have indicated that the user is a frequent shopper at Sam's market and would be a good candidate to receive a coupon form Sam's market.

While the present invention has been described with reference to exemplary embodiments herein, it will be appreciated that various changes in scope and detail may be made without departing from the intended scope as defined in the appended claims.

The invention claimed is:

1. A method, comprising:

receiving, by a messaging service at a programmatic intelligent agent running on a second computing device and from a first computing device, a message requesting a response message from the programmatic intelligent agent;

generating, by the second computing device, a request message comprising a link to automatically launch an application on the first computing device to perform authentication;

sending, by the second computing device, the request message comprising the link from the programmatic intelligent agent to the first computing device via the messaging service;

receiving, by the second computing device and from an authentication service, confirmation at the programmatic intelligent agent that a party has been authenticated via a contactless card; and initiating, by the second computing device, an authenticated messaging session between the first computing device and the programmatic intelligent agent in response to the confirmation that the party has been authenticated by the first computing device.

2. The method of claim 1, further comprising determining, by the programmatic intelligent agent, that the received message includes a request to access confidential information or sensitive information, wherein the programmatic intelligent agent generates the link to perform authentication based on the determination.

3. The method of claim 2, further comprising generating and sending the response message to the first computing device, wherein the response message contains at least some of the confidential information or at least some of the sensitive information.

4. The method of claim 2, wherein the party has a secure account with an institution and wherein the method further comprises the programmatic intelligent agent accessing the secure account to generate the response message.

5. The method of claim 1, wherein the received message requesting a response message requests a financial transaction.

6. The method of claim 1, wherein the messaging service is a Short Message Service (SMS) messaging service.

7. The method of claim 1, further comprising establishing a time limit to the authenticated messaging session such that at expiration of the time limit, the messaging session is no longer authenticated.

8. A computing apparatus comprising:

a processor; and a memory storing instructions that, when executed by the processor, configure the apparatus to:

receive, by a messaging service at a programmatic intelligent agent running on the computing apparatus and from a first computing device, a message requesting a response message from the programmatic intelligent agent;

generate a request message comprising a link to automatically launch an application on the first computing device to perform authentication;

send the request message comprising the link from the programmatic intelligent agent to the first computing device via the messaging service;

receive, from an authentication service, confirmation at the programmatic intelligent agent that a party has been authenticated via a contactless card; and initiate an authenticated messaging session between the first computing device and the programmatic intelligent agent in response to the confirmation that the party has been authenticated by the first computing device.

9. The computing apparatus of claim 8, wherein the instructions further configure the apparatus to determine, by the programmatic intelligent agent, that the received message includes a request access to confidential information or sensitive information, wherein the programmatic intelligent agent generates the link to perform authentication based on the determination.

10. The computing apparatus of claim 9, wherein the instructions further configure the apparatus to generate and send the response message to the first computing device, wherein the response message contains at least some of the confidential information or at least some of the sensitive information.

11. The computing apparatus of claim 9, wherein the party has a secure account with an institution and wherein the instructions further configure the apparatus to access, by the programmatic intelligent agent, the secure account to generate the response message.

12. The computing apparatus of claim 8, wherein the received message requesting a response message requests a financial transaction.

13. The computing apparatus of claim 8, wherein the messaging service is a Short Message Service (SMS) messaging service.

14. The computing apparatus of claim 8, wherein the instructions further configure the apparatus to establish a time limit to the authenticated messaging session such that at expiration of the time limit, the messaging session is no longer authenticated.

15. A non-transitory computer-readable storage medium, the computer-readable storage medium including instructions that when executed by a computer, cause the computer to:

receive, by a messaging service at a programmatic intelligent agent running on the computer and from a first computing device, a message requesting a response message from the programmatic intelligent agent;

generate a request message comprising a link to automatically launch an application on the first computing device to perform authentication;

send the request message comprising the link from the programmatic intelligent agent to the first computing device via the messaging service;

receive, from an authentication service, confirmation at the programmatic intelligent agent that a party has been authenticated via a contactless card; and initiate an authenticated messaging session between the first computing device and the programmatic intelligent agent in response to the confirmation that the party has been authenticated by the first computing device.

16. The non-transitory computer-readable storage medium of claim 15, wherein the instructions further configure the computer to determine, by the programmatic intelligent agent, that the received message includes a request access to confidential information or sensitive information, wherein the programmatic intelligent agent generates the link to perform authentication based on the determination.

17. The non-transitory computer-readable storage medium of claim 16, wherein the instructions further configure the computer to generate and send the response message to the first computing device, wherein the response message contains at least some of the confidential information or at least some of the sensitive information.

18. The non-transitory computer-readable storage medium of claim 16, wherein the party has a secure account with an institution and wherein the instructions further configure the computer to access, by the programmatic intelligent agent, the secure account to generate the response message.

19. The non-transitory computer-readable storage medium of claim 15, wherein the received message requesting a response message requests a financial transaction.

20. The non-transitory computer-readable storage medium of claim 15, wherein the instructions further configure the computer to establish a time limit to the authenticated messaging session such that at expiration of the time limit, the messaging session is no longer authenticated.

* * * * *